United States Patent
Kobayashi et al.

(10) Patent No.: US 10,197,898 B2
(45) Date of Patent: Feb. 5, 2019

(54) LIGHTING DEVICE, PROJECTOR, DISPLAY SYSTEM, AND LIGHT SOURCE ADJUSTMENT METHOD

(71) Applicant: NEC Display Solutions, Ltd., Tokyo (JP)

(72) Inventors: Hiroyuki Kobayashi, Tokyo (JP); Tsutomu Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/569,074

(22) PCT Filed: May 22, 2015

(86) PCT No.: PCT/JP2015/064733
§ 371 (c)(1),
(2) Date: Oct. 24, 2017

(87) PCT Pub. No.: WO2016/189582
PCT Pub. Date: Dec. 1, 2016

(65) Prior Publication Data
US 2018/0136552 A1   May 17, 2018

(51) Int. Cl.
*G03B 21/20* (2006.01)
*H05B 37/02* (2006.01)
*H04N 9/31* (2006.01)

(52) U.S. Cl.
CPC ....... *G03B 21/2053* (2013.01); *G03B 21/204* (2013.01); *G03B 21/206* (2013.01);
(Continued)

(58) Field of Classification Search
CPC .. G03B 21/204; G03B 21/206; G03B 21/208; G03B 21/2013; G03B 21/2053;
(Continued)

(56) References Cited

U.S. PATENT DOCUMENTS

2010/0328554 A1* 12/2010 Shibasaki ............ G03B 21/204
                                                              348/760
2011/0292098 A1   12/2011 Iwanaga
(Continued)

FOREIGN PATENT DOCUMENTS

CN   103186019 A   7/2013
CN   103430093 A   12/2013
(Continued)

OTHER PUBLICATIONS

International Search Report (ISR) (PCT Form PCT/ISA/210), in PCT/JP2015/064733, dated Jul. 7, 2015.
(Continued)

*Primary Examiner* — Sultan Chowdhury
(74) *Attorney, Agent, or Firm* — McGinn I.P. Law Group, PLLC.

(57) ABSTRACT

A lighting device includes: a first light source that supplies yellow fluorescent light; a second light source that supplies blue light; a light sensor that detects the light quantity of a blue component of combined light, in which the yellow fluorescent light and blue light have been combined, and the light quantity of a first color component that is contained in the yellow fluorescent light and that differs from the blue component; and a control unit that adjusts the luminance of the first and second light sources. The control unit acquires each of a first light quantity that is the light quantity of the first color component and a second light quantity that is the light quantity of the blue component in a first state in which the first light source is ON and the second light source is OFF, and acquires a third light quantity.

20 Claims, 7 Drawing Sheets

(52) U.S. Cl.
CPC ....... *G03B 21/208* (2013.01); *G03B 21/2013* (2013.01); *H04N 9/3194* (2013.01); *H05B 37/02* (2013.01); *G03B 21/2066* (2013.01)

(58) Field of Classification Search
CPC ............. G03B 21/2066; H04N 9/3158; H04N 9/3161; H04N 9/3164; H04N 9/3182; H04N 9/31594; F21V 13/00; F21V 13/02; F21V 13/04; F21V 13/08; F21V 13/14
See application file for complete search history.

(56) References Cited

U.S. PATENT DOCUMENTS

| | | | | |
|---|---|---|---|---|
| 2014/0140038 | A1* | 5/2014 | Gerets | G03B 21/16 362/84 |
| 2014/0198261 | A1 | 7/2014 | Yamaguchi et al. | |
| 2014/0347634 | A1* | 11/2014 | Bommerbach | H04N 9/3158 353/31 |
| 2015/0109584 | A1* | 4/2015 | Murai | H04N 9/3114 353/31 |

FOREIGN PATENT DOCUMENTS

| | | |
|---|---|---|
| CN | 103686106 A | 3/2014 |
| CN | 104360490 A | 2/2015 |
| JP | 2007-065012 A | 3/2007 |
| JP | 2011-28244 A | 2/2011 |
| JP | 2011-044367 A | 3/2011 |
| JP | 2012-215755 A | 11/2012 |
| JP | 2014-107713 A | 6/2014 |
| JP | 2014-240912 A | 12/2014 |
| JP | 2015-106130 A | 6/2015 |
| JP | 2016-161738 A | 9/2016 |

OTHER PUBLICATIONS

Decision to Grant a Patent dated Aug. 21, 2018 in Japanese Application No. 2017-520060 with an English translation thereof.
Chinese Office Action, dated Nov. 14, 2018, in Chinese Application No. 201580080253.7 and English Translation thereof.

* cited by examiner

LIGHTING DEVICE, PROJECTOR, DISPLAY SYSTEM, AND LIGHT SOURCE ADJUSTMENT METHOD

TECHNICAL FIELD

The present invention relates to a lighting device that employs a phosphor as a light source, a projector that is provided with the lighting device, and a light source adjustment method of the lighting device. The present invention further relates to a display system that uses the projector.

BACKGROUND ART

Patent Document 1 discloses a projector that is provided with a lighting device that employs a phosphor as a light source.

The lighting device includes a first blue semiconductor laser, a second blue semiconductor laser, a dichroic mirror, a phosphor wheel, a wavelength selection wheel, and a rod integrator. The first blue semiconductor laser supplies first blue light (excitation light) having a wavelength of approximately 450 nm. The second blue semiconductor laser supplies second blue light (illumination light) having a wavelength of approximately 460 nm.

The first blue light supplied from the first blue semiconductor laser is incident to one surface of the dichroic mirror at an angle of incidence of approximately 450. The dichroic mirror is a color combination element in which the cutoff wavelength is set to approximately 90 nm and has characteristics of high reflectivity for a wavelength component which is shorter than the cutoff wavelength and high transmission for a wavelength component which is longer than the cutoff wavelength. The first blue light is reflected by one surface of the dichroic mirror.

The first blue light that is reflected by the dichroic mirror is incident to the phosphor wheel by way of a lens group. The phosphor wheel has a phosphor region that contains a phosphor that emits yellow fluorescent light in response to excitation by the first blue light. The yellow fluorescent light (illumination light) from the phosphor region is incident to the dichroic mirror by way of a lens group. The yellow fluorescent light is transmitted through the dichroic mirror.

The second blue light that is supplied from the first blue semiconductor laser is incident to the other surface of the dichroic mirror at an angle of incidence of approximately 45°. The second blue light is reflected by this other surface of the dichroic mirror.

The yellow fluorescent light that is transmitted through the dichroic mirror and the second blue light that is reflected by the other surface of the dichroic mirror are incident to one end surface of the rod integrator along the same light path. The yellow fluorescent light and second blue light that are emitted from the other end surface of the rod integrator are incident to the wavelength-selection wheel. The wavelength-selection wheel has first to third wavelength-selection regions.

The first wavelength-selection region has a high transmission characteristic for the blue component and red component and a high reflection characteristic for the green component, the cutoff wavelengths being 490 nm and 600 nm, respectively. The second wavelength-selection region has a high transmission characteristic for the blue component and the green component and a high reflection characteristic for the red component, the cutoff wavelength being 600 nm. The third wavelength-selection region has a high transmission characteristic across the entire range of visible wavelengths.

The light that is emitted from the rod integrator is successively irradiated into the first to third wavelength-selection regions. By controlling the lighting operation of the first blue light source and second blue light source in synchronization with the rotation operation of the wavelength-selection wheel, red light, green light, blue light, and white light are successively emitted from the wavelength-selection wheel. The red light, green light, blue light, and white light that are emitted from the wavelength-selection wheel are the output light of the lighting device.

The output light of the lighting device is irradiated into a digital micromirror device (DMD). The DMD successively forms images of each of the colors red, green, and blue. The images of each of the colors formed by the DMD are enlarged and projected upon a screen by way of a projection lens.

Literature of the Prior Art

Patent Documents

Patent Document 1: Japanese Unexamined Patent Application Publication No. 2014-240912

DISCLOSURE OF INVENTION

When a forward-direction operation is caused to continue in a light-emitting element such as a semiconductor laser (also called a "laser diode"), voltage or current that does not contribute to light emission typically increases, leading to an increase in element temperature, and as a result, a decrease in luminance (the light emission characteristic changes over time). The degree of deterioration resulting from this change over time depends on the ambient temperature of use of the light-emitting element.

In the projector disclosed in Patent Document 1, the ambient temperature of use of the first blue semiconductor laser may differ from the ambient temperature of use of the second blue semiconductor. In this case, the degree of deterioration due to change over time of the first blue semiconductor will differ from the degree of deterioration caused by the change over time of the second blue semiconductor, and color balance among the red light, green light, and blue light may therefore shift.

In addition, the light emission efficiency of the phosphor also decreases according to the length of use. The speed of deterioration of the phosphor resulting from this change over time is faster than the speed of deterioration of the blue semiconductor. As a consequence, the decrease in light quantity of the yellow fluorescent light progresses faster than the decrease in light quantity of the second blue semiconductor laser, with the result that the color balance among the red light, green light and blue light may shift.

The color balance can be corrected by detecting the light quantity of each of the red, green, and blue color components that are contained in the illumination light (white light) and adjusting the luminance of the first blue semiconductor laser and second blue semiconductor laser such that the light quantity of each color becomes a predetermined ratio. However, this correction method entails the problems described below because the luminance of the first blue semiconductor laser is adjusted such that the light quantities of red and green reach predetermined values and the luminance of the second blue semiconductor laser is adjusted such that the blue light quantity reaches a predetermined value.

The light emission spectrum of the yellow fluorescent light is broad, and although of a limited quantity, blue is also contained in this color component apart from red and green. The light of the blue component of this yellow fluorescent light is transmitted through the dichroic mirror and irradiated into the rod integrator on the same light path as the blue light (second blue light). In other words, the illumination light that is supplied by the lighting device contains light of the blue component of the yellow fluorescent light (blue crosstalk). In the above-described correction method, accurate adjustment of the color balance of red, green, and blue becomes problematic due to this blue crosstalk (on the order of 10%).

The present invention provides a lighting device, a projector provided with this lighting device, and a light source adjustment method of the lighting device that enable the accurate adjustment of the color balance of red light, green light, and blue light and thus solves each of the above-described problems.

It is another object of the present invention to provide a display system that uses a projector of this type.

According to one aspect of the present invention for achieving the above-described objects, a lighting device is provided that includes:

a first light source that supplies yellow fluorescent light;

a second light source that supplies blue light;

a light sensor that detects the light quantity of the blue component of combined light in which the blue light and the yellow fluorescent light have been combined and the light quantity of a first color component that is contained in the yellow fluorescent light and that differs from the blue component; and a control unit that adjusts the luminance of the first and second light sources;

wherein the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and, on the basis of the first to third light quantities, adjusts the luminance of the first and second light sources such that the ratio of the light quantities of the first color component and the blue component of the combined light becomes a predetermined ratio.

According to another aspect of the present invention, a projector is provided that includes:

a first light source that supplies yellow fluorescent light;

a second light source that supplies blue light;

a light sensor that detects the light quantity of a blue component of combined light in which the blue light and the yellow fluorescent light have been combined and the light quantity of a first color component that is contained in the yellow fluorescent light and that differs from the blue component;

display elements that modulate the combined light on the basis of a picture signal to form images;

projection optics that project the images that were formed in the display elements; and a control unit that controls the luminance of the first and second light sources;

wherein the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and, on the basis of the first to third light quantities, adjusts the luminance of the first and second light sources such that the ratio of the light quantities of the first color component and the blue component of the combined light becomes a predetermined ratio.

According to yet another aspect of the present invention, a light source adjustment method is provided that is the light source adjustment method of a lighting device that is provided with: a first light source that supplies yellow fluorescent light, a second light source that supplies blue light, and a light sensor that detects the light quantity of a blue component of combined light in which the blue light and the yellow fluorescent light have been combined and the light quantity of a first color component that is contained in the yellow fluorescent light and that differs from the blue component; the light source adjustment method including:

acquiring each of a first light quantity that is the light quantity of the first color component and a second light quantity that is the light quantity of the blue component in a first state in which the first light source is ON and the second light source is OFF;

acquiring a third light quantity that is the light quantity of the blue component in a second state in which the first light source is OFF and the second light source is ON; and on the basis of the first to third light quantities, adjusting the luminance of the first and second light sources such that the ratio of the light quantities of the first color component and the blue component of the combined light becomes a predetermined ratio.

According to an aspect of the present invention for achieving the above-described objects, a display system is provided that has a plurality of projectors that are connected to enable intercommunication, each of the plurality of projectors including:

a first light source that supplies yellow fluorescent light;

a second light source that supplies blue light;

a light sensor that detects the light quantity of a blue component of combined light in which the blue light and the yellow fluorescent light have been combined and the light quantity of a first color component that is contained in the yellow fluorescent light and that differs from the blue component;

display elements that modulate the combined light on the basis of a picture signal to form images;

projection optics that project the images formed in the display elements; and a control unit that controls the luminance of the first and second light sources;

wherein the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and, on the basis of the first to third light quantities, adjusts the luminance of the first and second light sources such that the ratio of the light quantities of the first color component and the blue component of the combined light becomes a predetermined ratio;

one of the plurality of projectors is a main projector, and the other projectors are sub-projectors; and the control unit of the main projector controls the luminance adjustment of the first and second light sources in its own projector and in each of the sub-projectors, taking as a standard, the smallest measurement value among the first light quantity of its own projector and the first light quantities of the sub-projectors.

DESCRIPTION OF EXAMPLE EMBODIMENTS

Example embodiments of the present invention are next described with reference to the accompanying drawings.

First Example Embodiment

Figure 1:
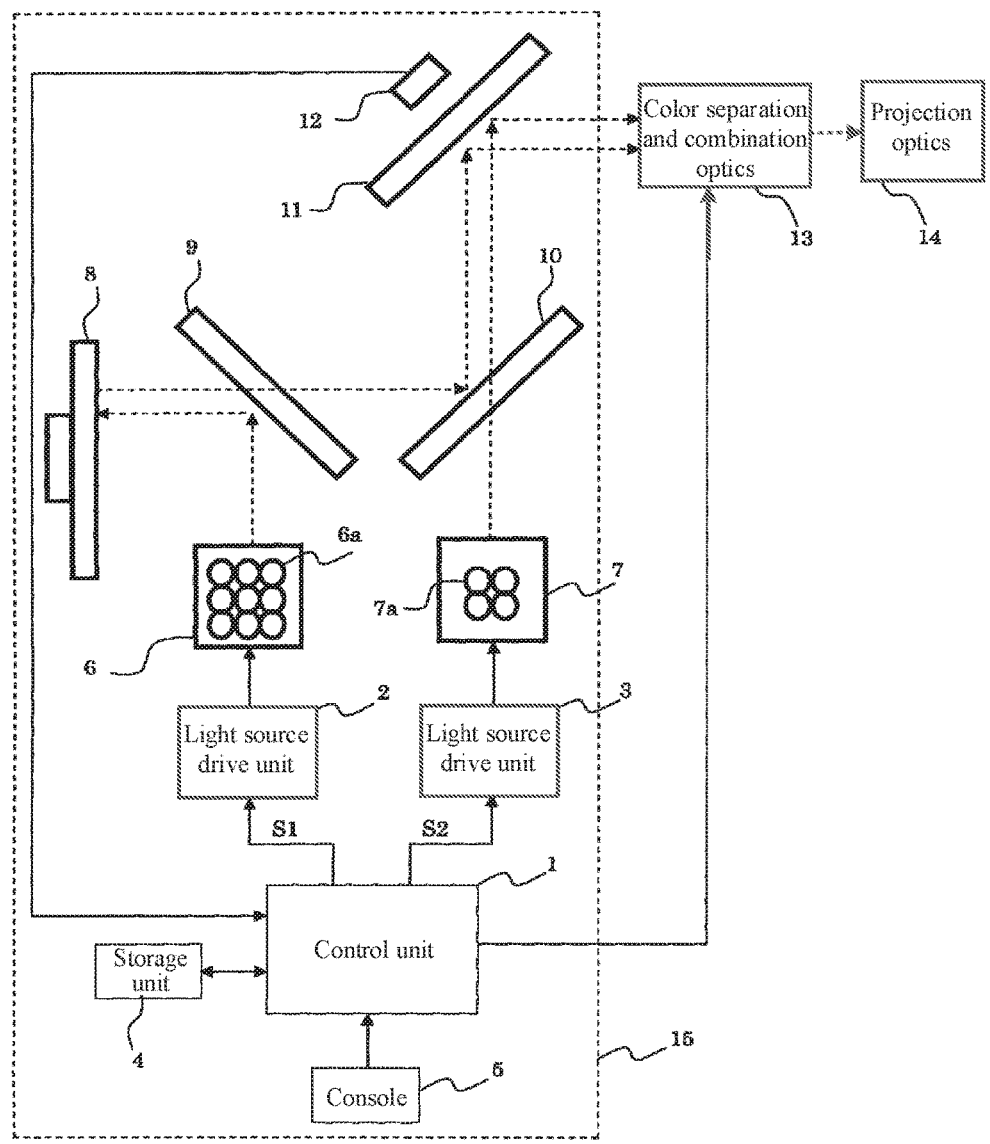
FIG. 1 is a block diagram showing the configuration of a projector that is provided with a lighting device that is the first example embodiment of the present invention.

FIG. 1 is a block diagram showing the configuration of a projector that is provided with a lighting device that is the first example embodiment of the present invention.

Referring to FIG. 1, the projector includes lighting device 15, color separation and combination optics 13, and projection optics 14.

Color separation and combination optics 13 includes a color separation unit, first to third display elements, and a color combination unit. A color separation unit, which is a component that separates white light that is the output light of lighting device 15 into red light, green light, and blue light, is made up of a plurality of dichroic mirrors, a lens group, and a mirror.

Display panels such as liquid crystal display elements or digital micromirror devices (DMD) can be used as the first to third display elements. The first display element modulates red light to form a red image. The second display element modulates green light to form a green image. The third display element modulates blue light to form a blue image.

The color combination unit is a component that combines the red image light, the green image light, and the blue image light that were formed by the first to third display elements. A component such as a cross-dichroic prism can be used as the color combination unit. The image light that is combined in the color combination unit is incident to projection optics 14. Projection optics 14 enlarge and project the red image, green image, and blue image that were formed by the first to third display elements upon a screen (not shown).

Lighting device 15 includes control unit 1, light source drive units 2 and 3, storage unit 4, console 5, light sources 6 and 7, phosphor wheel 8, dichroic mirrors 9 and 10, reflecting mirror 11, and light sensor 12.

Light source 6 is an excitation light source and includes a plurality of blue laser elements 6a. The blue light (blue excitation light) that is supplied from blue laser elements 6a, after having been converted to parallel luminous flux by passage through a collimator lens (not shown), is incident to dichroic mirror 9. In the example shown in FIG. 1, nine blue laser elements 6a are shown, but the number of blue laser elements 6a is not limited to nine. The number of blue laser elements 6a can be altered as appropriate.

Light source 7 includes a plurality of blue laser elements 7a. The blue light (illumination light) that is supplied from blue laser elements 7a, after being converted to parallel luminous flux by passage through a collimator lens (not shown), is incident to dichroic mirror 10. Although four blue laser elements 7a are shown in the example shown in FIG. 1, the number of blue laser elements 7a is not limited to four. The number of blue laser elements 7a can be altered as appropriate.

Dichroic mirror 9 is provided to reflect the blue light from light source 6 in the direction of phosphor wheel 8. The angle of incidence of the blue light from light source 6 to dichroic mirror 9 is approximately 45°. Here, the angle of incidence is the angle formed by the line of light incidence and the normal line erected on the point of incidence. In the following explanation, the definition of the angle of incidence is the same.

Dichroic mirror 9 has a spectral reflection characteristic that reflects, of visible light, light of the blue wavelength band and transmits light of other wavelength bands. Because the curve that represents the cutoff wavelength of the spectral reflection characteristic of dichroic mirror 9 is not steep, for wavelength bands in the vicinity of the cutoff wavelength, a portion (several percent) of blue light is transmitted through dichroic mirror 9. In other words, of the blue wavelength band, a portion (several percent) of light of the wavelength band that is closer to green passes through dichroic mirror 9. Further, because the oscillation wavelength of blue laser elements 6a is sufficiently shorter than the cutoff wavelength of dichroic mirror 9, nearly all of the blue light from blue laser elements 6a is reflected by dichroic mirror 9.

Figure 2:
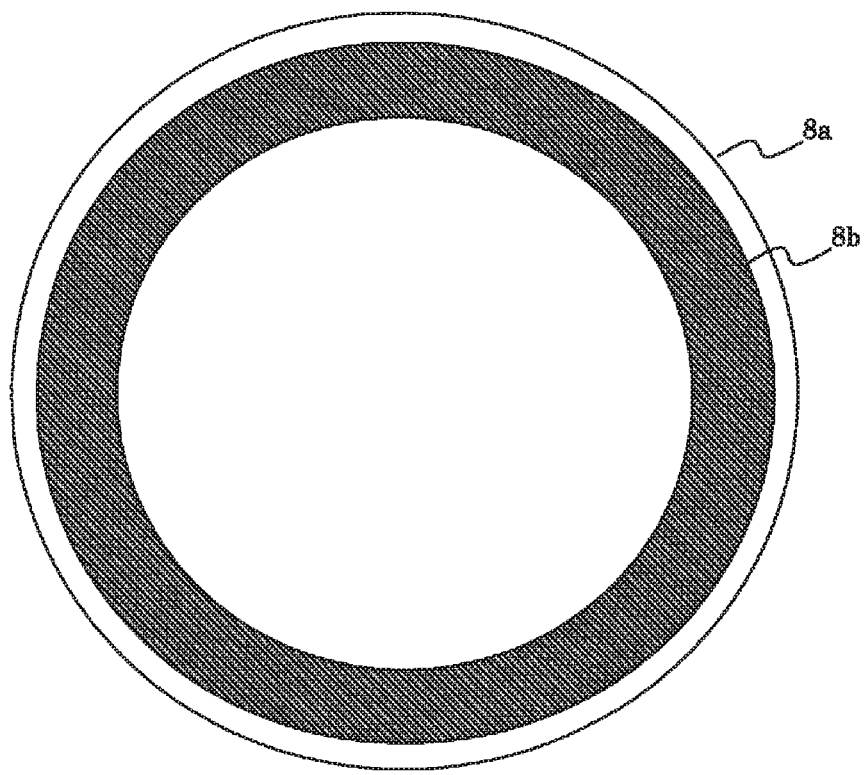
FIG. 2 is a schematic view showing an example of a phosphor wheel.

As shown in FIG. 2, phosphor wheel 8 includes wheel unit 8a and phosphor region 8b provided on wheel unit 8a along the circumferential direction. Phosphor region 8b contains a phosphor that receives excitation light and emits yellow fluorescent light. Blue light (excitation light) that is reflected by dichroic mirror 9 is incident to phosphor region 8b by way of a lens group (not shown). A motor rotates wheel unit 8a at a predetermined speed, and in this state, the blue light from dichroic mirror 9 is irradiated upon phosphor region 8b. The phosphor that receives the blue light on phosphor region 8b emits yellow fluorescent light.

The yellow fluorescent light that is emitted from phosphor unit 8 is incident to dichroic mirror 9 by way of a lens group (not shown). The light-emission spectrum of this yellow fluorescent light is broad and includes a blue component in addition to a green component and a red component. The wavelength of this blue component is close to the cutoff wavelength of dichroic mirror 9, and several percent of the blue component that is contained in the yellow fluorescent light is therefore transmitted through dichroic mirror 9. The wavelengths of the green component and red component that are contained in the yellow fluorescent light are sufficiently longer than the cutoff wavelength of dichroic mirror 9 and nearly all of this light is therefore transmitted through dichroic mirror 9. The yellow fluorescent light that is transmitted through dichroic mirror 9 is incident to one surface of dichroic mirror 10.

Dichroic mirror 10 is provided at the position of intersection of the luminous flux of the yellow fluorescent light that is transmitted through dichroic mirror 9 and the luminous flux of the blue light from light source 7 such that the yellow fluorescent light is incident to one surface and the blue light is incident to the other surface. The angle of incidence of the yellow fluorescent light to dichroic mirror 10 is approximately 45°, and dichroic mirror 10 is provided such that the yellow fluorescent light is reflected in the direction of reflecting mirror 11.

Dichroic mirror 10 has the spectral reflection characteristic of transmitting, of visible light, light of the blue wavelength band and reflecting light of wavelength bands other than the blue wavelength band. Because the curve that represents the cutoff wavelength of the spectral reflection characteristic of dichroic mirror 10 is not steep, in the wavelength band in the vicinity of the cutoff wavelength, a portion (several percent) of the blue light is reflected by dichroic mirror 10. In other words, of the blue wavelength band, a portion (several percent) of the light of the wavelength band on the side closer to green is reflected by dichroic mirror 10. Further, because the oscillation wavelength of blue laser elements 7a is sufficiently shorter than the cutoff wavelength of dichroic mirror 10, nearly all of the blue light from blue laser elements 7a is transmitted through dichroic mirror 10.

The yellow fluorescent light that is reflected by dichroic mirror 10 and the blue light that is transmitted through dichroic mirror 10 are incident to reflecting mirror 11 on substantially the same light path; i.e., white light that contains the yellow fluorescent light and blue light is incident to reflecting mirror 11 from dichroic mirror 10. In other words, dichroic mirror 10 is used to combine the yellow fluorescent light and the blue light, and the combined light that has been combined is incident to reflecting mirror 11. Dichroic mirror 10 is one example of a color combination element. Further, dichroic mirror 10 may also have a spectral reflection characteristic of reflecting, of visible light, light of the blue wavelength band and transmitting light of wavelength bands other than the blue wavelength band. In this case, yellow fluorescent light that has been transmitted through dichroic mirror 10 and blue light that has been reflected by dichroic mirror 10 may be incident to reflecting mirror 11 on substantially the same light path.

Reflecting mirror 11 is provided such that blue light and yellow fluorescent light from dichroic mirror 10 are reflected in the direction of color separation and combination optics 13. A portion (several percent) of the light that is incident to reflecting mirror 11 from dichroic mirror 10 is transmitted through reflecting mirror 11, i.e., reflecting mirror 11 divides the luminous flux that is incident from dichroic mirror 10 into first luminous flux (reflected light) and second luminous flux (transmitted light). Reflecting mirror 11 is an example of a light-dividing element.

Light sensor 12 is provided on the rear-surface side of reflecting mirror 11. Light sensor 12 includes a first light-receiving surface provided with a green filter and a second light-receiving surface provided with a blue filter; these first and second light-receiving surfaces receiving second luminous flux from reflecting mirror 11. The green filter transmits, of visible light, light of the green wavelength band and absorbs light of other wavelength bands. The blue filter transmits, of visible light, light of the blue wavelength band and absorbs light of other wavelength bands. The areas of the first and second light-receiving surfaces are equal to each other. Light sensor 12 supplies a signal that indicates each of the light quantity of the light (green component) that is incident to the first light-receiving surface and the light quantity of the light (blue component) that is incident to the second light-receiving surface.

Light sensor 12 is configured to photo-detect second luminous flux that was divided by reflecting mirror 11 but is not limited to this form. Light sensor 12 may also be configured to photo-detect all or a portion of the combined light that contains yellow fluorescent light and blue light that were combined using dichroic mirror 10.

Light source drive unit 2 drives each blue laser element 6a of light source 6 in accordance with control signal S1 from control unit 1. Light source drive unit 3 drives each blue laser element 7a of light source 7 in accordance with control signal S2 from control unit 1.

Storage unit 4 is a storage device such as a semiconductor memory or hard disk drive (HDD) and holds programs or data that are necessary for causing the projector to operate. Here, the data include data for light source luminance adjustment that are necessary for adjusting the luminance of the light source.

Console 5 includes a power supply button and a plurality of operation keys. The power supply button is a button for applying the power supply of the projector. When the user performs input operations using the operation keys, console 5 supplies operation signals that indicate the input content to the control unit.

Control unit 1 is made up of a CPU (Central Processing Unit) that operates in accordance with a program that is held in storage unit 4 and controls the operation of the entire projector in accordance with operation signals from console 5. For example, control unit 1 controls the rotation operation of phosphor wheel 8 and the image formation operation of each display element of color separation and combination optics 13. In addition, control unit 1 executes a light source luminance adjustment process according to the introduction of the power supply or predetermined input operation.

In FIG. 1, the luminous flux of the blue light that is supplied from light sources 6 and 7 and the luminous flux of the yellow fluorescent light that is emitted from phosphor wheel 8 are each indicated by broken lines for the sake of convenience, but in actuality, the luminous flux has a predetermined diameter. The center ray of the luminous flux of the blue light and the center ray of the luminous flux of the yellow fluorescent light coincide.

The operation of lighting device 1 of the present example embodiment is next described. Because the light source luminance adjustment process is the main feature and the operation and processes are otherwise the same as existing lighting devices, the light source luminance adjustment process is here described.

Figure 3:
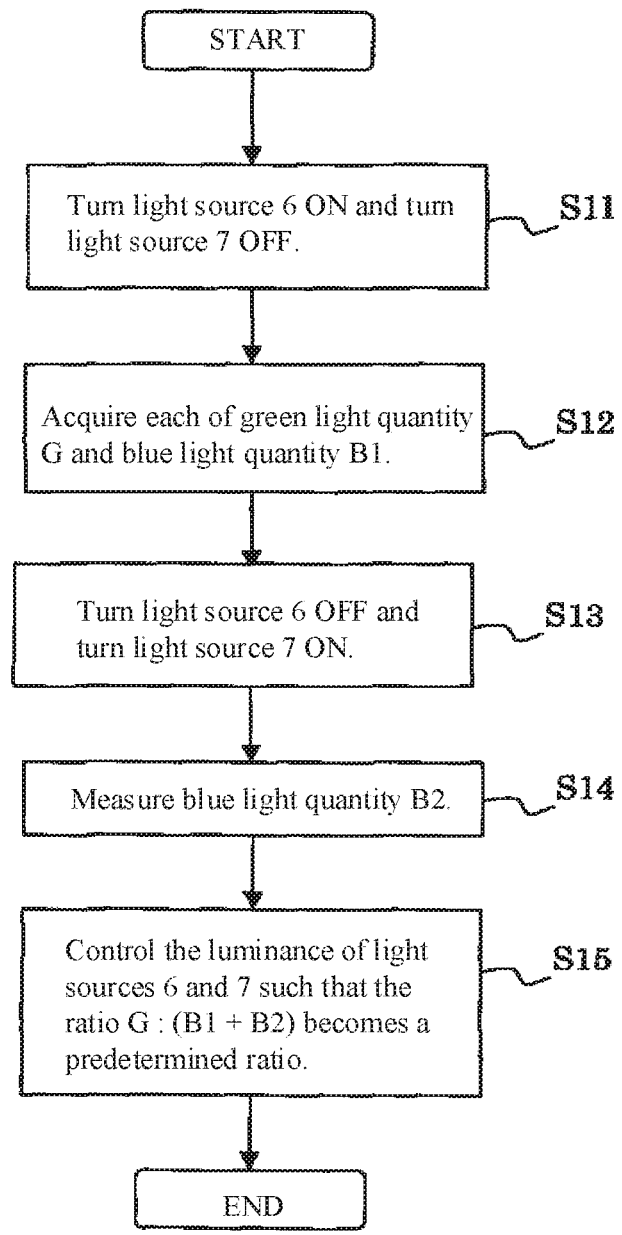
FIG. 3 is a flow chart showing the procedures of the light source luminance adjustment process of the lighting device shown in FIG. 1.

FIG. 3 shows the procedures of the light source luminance adjustment process. The light source luminance adjustment process is described with reference to FIGS. 1-3.

In accordance with an operation signal indicating that light source luminance adjustment is to be carried out (or the introduction of the power supply), control unit 1 turns ON light source 6 and turns OFF light source 7 (Step S11). The state in which light source 6 is ON and light source 7 is OFF is the first state. In this first state, only yellow fluorescent light from phosphor wheel 8 is incident to light sensor 12 as the second luminous flux.

Control unit 1 next acquires the measurement values of each of light quantity G of the green component and light quantity B1 of the blue component of the second luminous flux on the basis of the output signal of light sensor 12 (Step S12). Here, light quantity G corresponds to the light quantity of the green component of the yellow fluorescent light, and light quantity B1 corresponds to the light quantity of the blue component of the yellow fluorescent light.

Control unit 1 next turns OFF light source 6 and turns ON light source 7 (Step S13). The state in which light source 6 is OFF and light source 7 is ON is the second state. In this second state, only the blue light from light source 7 is incident to light sensor 12 as the second luminous flux.

Control unit 1 next acquires the measurement value of light quantity B2 of the blue component of the second luminous flux on the basis of the output signal of light sensor 12 (Step S14). Light quantity B2 here corresponds to the light quantity of the blue light from light source 7.

Control unit 1 next controls the luminance of light sources 6 and 7 on the basis of the measurement value of green light quantity G, the measurement of blue light quantity B1, the measurement value of blue light quantity B2, and the ratio (the predetermined ratio) of the light quantity of the green light and blue light that is given in advance. More specifically, control unit 1 controls the luminance of light sources 6 and 7 such that ratio [G:(B1+B2)] becomes the predetermined ratio.

Further, in the event of a phenomenon, in which blue laser elements separately no longer emit light, is concentrated in light source 7 and the light quantity of light source 7 falls to an unexpected value, a process of increasing the light quantity of light source 7 is preferably carried out. In the luminance adjustment process shown in FIG. 3, a determination of whether the measurement value of green light quantity G is equal to or less than a threshold value may be carried out before the process of Step S15. In this case, when the measurement value of green light quantity G is equal to or less than a threshold value, control unit 1 executes the processes from Step S11 after increasing the luminance of light source 7 by a predetermined amount. The threshold value is, for example, 60% or 50% of the initial value.

An example of the luminance adjustment is next described.

Luminance Adjustment Example 1

In each of light sources 6 and 7, the drive current can be adjusted in steps, the number of these steps being 128. In other words, the value of the step that is set corresponds to the value of the drive current that is set. In adjustment at the time of shipment, the green light quantity is set to the maximum and the blue light quantity is set to agree with this value. Here, light source 6 is set to step 128/128, light source 7 is set to step 100/128, and green light quantity G and blue light quantity B that are detected by light sensor 12 are 100 W (watts) and 50 W (watts), respectively. The output of light source 7 is preferably set on the basis of, for example, the number of blue laser elements 7a such that light source 7 can be set to a value that is less than 128, which is the maximum value of the number of steps. Green light quantity G is a light quantity that is equivalent to the green component contained in the yellow fluorescent light. Blue light quantity B includes light quantity B1 (blue crosstalk) that is equivalent to the blue component contained in the yellow fluorescent light and light quantity B2 that is equivalent to the blue light from light source 7. Light quantity B1 is 10 W, and light quantity B2 is 40 W. The ratio of green light quantity G and blue light quantity B is 2:1, and the color temperature of the illumination light that is supplied from lighting device 15 in this ratio is 6500 K (Kelvin). These conditions (G=100 W, B=50 W, B1=10 W, B2=40 W, ratio [G:B=2:1], ratio [G:B1=1:0.1], step value of light source 6=128, and step value of light source 7=100) are held in storage unit 4 as the initial values of the light source luminance adjustment data.

It will be assumed that the light quantity of the yellow fluorescent light has decreased by 10% due to change over time of phosphor wheel 8. Control unit 1 acquires each of green light quantity G, blue light quantities B1 and B2 following the change over time in accordance with the procedure shown in FIG. 3. Green light quantity G is 90 W, blue light quantity B1 is 9 W, and blue light quantity B2 is 40 W. Green light quantity G has decreased from 100 W to 90 W, and blue light quantity B1 has decreased from 10 W to 9 W. Blue light quantity B2 remains unchanged at 40 W, and the light quantity of the blue light of light source 7 does not change.

Since green light quantity G is 90 W, control unit 1 sets the target value of blue light quantity B to 45 W on the basis of ratio [G:B=2:1]. Since blue light quantity B1 is 9 W, control unit 1 sets the target value of blue light quantity B2 to 36 (=45−9) W. Control unit 1 then calculates the adjustment value of light source 7 on the basis of the target value "36" of blue light quantity B2. The adjustment value of light source 7 is a value obtained by dividing the target value "36" by the measurement value "40" of blue light quantity B2 (0.9000=36/40). Control unit 1 adjusts the luminance of light source 7 such that the light quantity of light source 7 becomes a multiple of 0.9000.

Comparative Example: A Case in which the Blue Light Quantity B1, which is the Blue Crosstalk, is not Considered In this comparative example, blue light quantity B is taken to be equal to blue light quantity B2 and blue light quantity B1 is taken as 0.

When the light quantity of yellow fluorescent light has decreased by 10% due to change over time of phosphor wheel 8, green light quantity G and blue light quantity B after the change over time are 90 W and 49 W, respectively. Based on the ratio [G:B=2:1], the target value of blue light quantity B (=B2) is 45 W, and the adjustment value of light source 7 is 0.9184 (=45/49). Luminance adjustment of light source 7 is carried out such that the light quantity of light source 7 is a multiple of 0.9184. In this case, color balance cannot be accurately corrected.

Luminance Adjustment Example 2

The initial values are identical to those of Luminance Adjustment Example 1 described above. Blue light quantity B is assumed to have decreased by 20% due to change over time of light source 7 or due to changes in the ambient temperature.

Control unit 1 acquires each of green light quantity G and blue light quantities B1 and B2 that follow deterioration in accordance with the procedure shown in FIG. 3. Green light quantity G is 100 W, blue light quantity B1 is 10 W, and blue light quantity B2 is 30 W. Blue light quantity B2 has decreased from 40 W to 30 W. Green light quantity G remains unchanged at 100 W, and blue light quantity B1 also remains unchanged at 10 W.

Because green light quantity G is 100 W, control unit 1 sets the target value of blue light quantity B at 50 W on the basis of the ratio [G:B=2:1]. Since blue light quantity B1 is 10 W, control unit 1 sets the target value of blue light quantity B2 to 40 (=50−10)W. Control unit 1 then calculates the adjustment value of light source 7 on the basis of the target value "40" of blue light quantity B2. The adjustment value of light source 7 is a value obtained by dividing target value "40" by the measurement value "30" of blue light quantity B2, i.e., (1.3333=40/30). Control unit 1 adjusts the luminance of light source 7 such that the light quantity of light source 7 becomes a multiple of 1.3333.

Luminance Adjustment Example 3

The initial values are identical to the values in Luminance Adjustment Example 1 described above. Explanation here regards a case in which blue light quantity B has decreased (deteriorated) from 50 W to 40 W due to change over time of light source 7 or change of the ambient temperature, and the light quantity of light source 7 cannot be made a multiple of 1.3333 even when the maximum value of the step value is set to 128.

In a luminance adjustment that makes the light quantity of light source 7 a multiple of 1.3333, control unit 1 determines whether the blue light quantity of light source 7 in which the step value has been set to 128 has reached 40 W on the basis of the output signal of light sensor 12. If the blue light quantity of light source 7 has not reached 40 W, control unit 1 again sets the target value.

In the resetting of the target value, control unit 1 sets the target values of green light quantity G and blue light quantities B, B1, and B2. More specifically, control unit 1 sets the target value of green light quantity G to 80 W that is lower than 100 W, and, based on the ratio [G:B=2:11], sets the target value of blue light quantity B to 40 W. Control unit 1 further sets the target value of blue light quantity B 1 to 8.00 W based on the ratio [G:B1=1:0.1]. Since the target value of blue light quantity B1 is 8.00 W, control unit 1 sets the target value of blue light quantity B2 to 32.0 (=40−8)W. Control unit 1 both calculates the adjustment value of light source 6 on the basis of the target value "80" of green light quantity G and calculates the adjustment value of light source 7 based on the target value "32.0" of blue light quantity B2.

In the calculation of the adjustment value, control unit 1 takes as the adjustment value of light source 6 a value (0.8000=80/100) obtained by dividing the target value "80" of green light quantity G by the measurement value "100" of green light quantity G. In addition, control unit 1 takes as the adjustment value of light source 7 a value (1.0667=32/30) obtained by dividing the target value "32" of blue light quantity B2 by the measurement value "30" of blue light quantity B2. Control unit 1 then adjusts the luminance of light source 6 such that the light quantity of light source 6 becomes a multiple of 0.8000, and further, adjusts the luminance of light source 7 such that the light quantity of light source 7 becomes a multiple of 1.0667.

According to lighting device 15 of the present example embodiment described above, luminance adjustment is carried out while giving consideration to light of the blue component (blue crosstalk) that is contained in the yellow fluorescent light from phosphor wheel 8, whereby color balance can be accurately adjusted and the adjustment time can be shortened. In Comparative Example 1, the blue crosstalk was not taken into consideration, and time was therefore required for fine adjustment.

Second Example Embodiment

Figure 4:
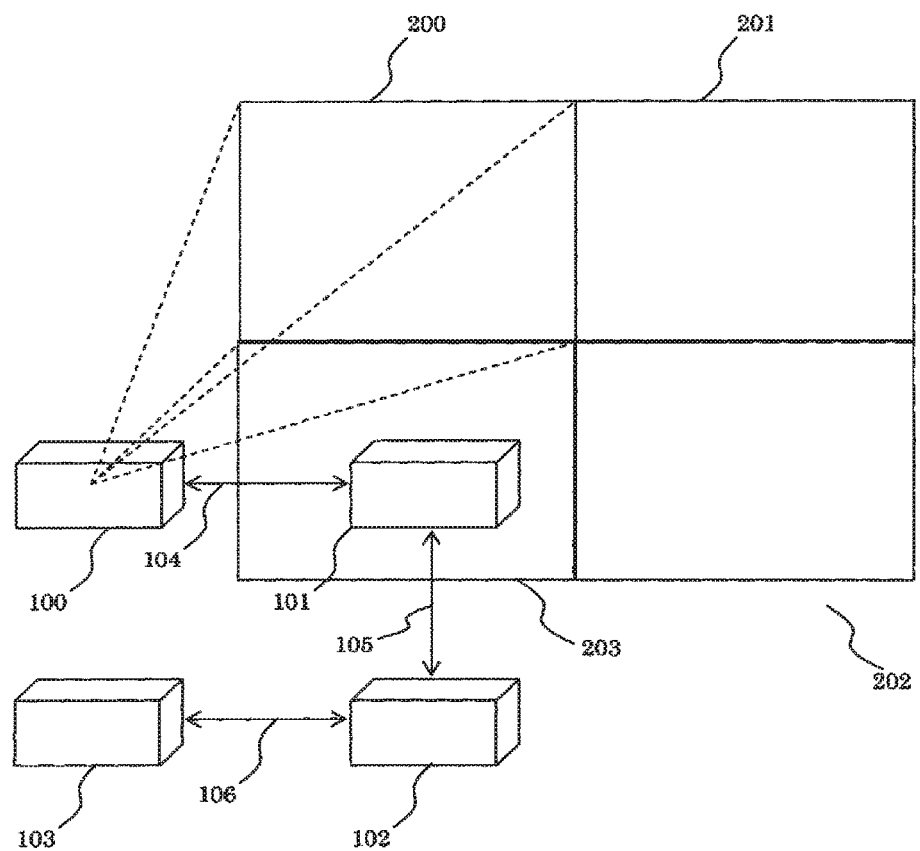
FIG. 4 is a schematic view showing the configuration of a display system having a plurality of projectors that are provided with lighting devices that are the second example embodiment of the present invention.

FIG. 4 is a schematic view showing the configuration of a display system that has a plurality of projectors provided with lighting devices that are the second example embodiment of the present invention.

Referring to FIG. 4, the display system includes four projectors 100-103. Projectors 100 and 101 are capable of intercommunication by way of communication cable 104. Projectors 101 and 102 are capable of intercommunication by way of communication cable 105. Projectors 102 and 103 are capable of intercommunication by way of communication cable 106. Wired/Wireless LAN, RS232C, and DDC/CI (Display Data Channel Command Interface) may also be applied to communication among projectors 100-103. Each of projectors 100-103 holds in advance address information required for intercommunication. In other words, projectors 100-103 are each able to communicate with each other.

Projector 100 projects upper left screen 200, projector 101 projects upper right screen 201, projector 102 projects lower left screen 202, and projector 103 projects lower right screen 203. Screens 200-203 make up a multi-screen.

A user is able to use the console of each of projectors 100-103 to carry out the setting of the main projector and the sub-projectors. Here, settings are made indicating that projector 100 is the main projector, and settings are made indicating that projectors 101-103 are each sub-projectors. Projector 100 that is the main projector both carries out luminance adjustment of the light sources with which it is provided and controls the luminance adjustment operation of the light sources of projectors 101-103 that are the sub-projectors to adjust the luminance of the entire multi-screen of screens 200-203.

Figure 5:
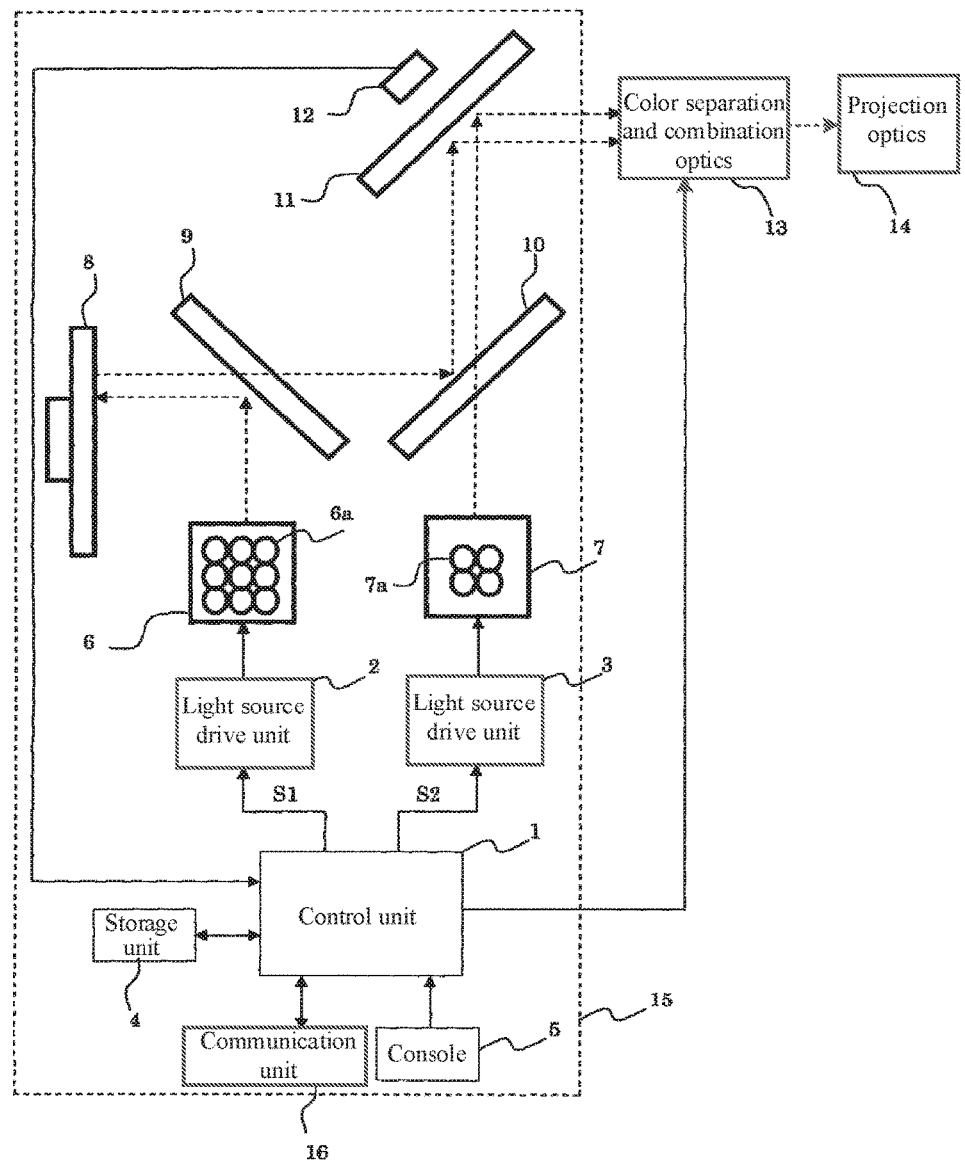
FIG. 5 is a block diagram showing the configuration of each projector of the display system shown in FIG. 4.

FIG. 5 shows the configuration of projector 100. Projector 100 shown in FIG. 5 is of a configuration in which communication unit 16 is added to the configuration shown in FIG. 1, the configuration other than communication unit 16 being the same as the configuration shown in FIG. 1. Communication unit 16 is a component for carrying out communication with outside projectors, and in this case, is connected to projector 101 by way of communication cable 104.

Projectors 101-103 are of the same basic configuration as projector 100. In the following explanation, for the sake of convenience, "-0" is appended to the end of the reference numbers that indicate each part of projector 100, "-1" is appended to the end of the reference numbers that indicate each part of projector 101, "-2" is appended to the end of the reference numbers that indicate each part of projector 102, and "-3" is appended to the end of the reference numbers that indicate each part of projector 103. For example, the reference numbers of the control unit of projectors 100-103 are "1-0", "1-1", "1-2", and "1-3", respectively.

In multi-screen luminance adjustment, control unit 1-0 in projector 100 sends a transmission request for the measurement values of green light quantity G to each of projectors 101-103 by way of communication unit 16-0. In projector 101, control unit 1-1 transmits by way of communication unit 16-1 green light quantity information G-1, in which the identification information of projector 101 has been appended to the measurement value of green light quantity G that was measured by light sensor 12-1, in accordance with the transmission request to projector 100 that is the transmission request source. Similarly, in projector 102, control unit 1-2 transmits green light quantity information G-2 to projector 100, and in projector 103, control unit 1-3 transmits green light quantity information G-3 to projector 100.

In projector 100, control unit 1-0 compares the four measurement values that include: the measurement value of green light quantity G that was measured by light sensor 12-0; and the measurement value of the green light quantity G that is contained in each of green light quantity information G-1-G-3 that were received from projectors 101-103. Control unit 1-0 then both holds the lowest value among these four measurement values as reference green light quantity G' in storage unit 4-0 and transmits a luminance adjustment command signal that contains reference green light quantity G' to each of projectors 101-103 by way of communication unit 16-0.

Following transmission of the luminance adjustment command signal, control unit 1-0 in projector 100 sets the target value of green light quantity G to the value of reference green light quantity G' and sets the target values of blue light quantities B, B1, and B2 on the basis of ratio [G:B] and ratio [G:B1] that are held in storage unit 4-0 as the initial values. The setting operation of these target values is the same as the operation of resetting the target values described in Luminance Adjustment Example 3 of the first example embodiment. Control unit 1-0 calculates the adjustment value of light source 6-0 on the basis of the measurement value and target value of green light quantity G and adjusts the luminance of light source 6-0 on the basis of the adjustment value. Control unit 1-0 further calculates the adjustment value of light source 7-0 on the basis of the measurement value and target value of blue light quantity B2 and adjusts the luminance of light source 7-0 on the basis of the adjustment value. These operations are also the same as the operation of resetting the target value that was described in Luminance Adjustment Example 3 of the first example embodiment.

In projector 101, control unit 1-1 sets the target value of green light quantity G to the value of reference green light quantity G' in accordance with a luminance adjustment command signal, and sets the target values of blue light quantities B, B1, and B2 on the basis of ratio [G:B] and ratio [G:B1] that are held in storage unit 4-1 as the initial values. Control unit 1-1 calculates the adjustment value of light source 6-1 on the basis of the measurement value and target value of green light quantity G and adjusts the luminance of light source 6-1 on the basis of the adjustment value. Control unit 1-1 further calculates the adjustment value of light source 7-1 on the basis of the measurement value and target value of blue light quantity B2 and adjusts the luminance of light source 7-1 on the basis of the adjustment value.

In projector 102, control unit 1-2 sets the target value of green light quantity G to the value of reference green light quantity G' in accordance with a luminance adjustment command signal and sets the target values of blue light quantities B, B1, and B2 on the basis of ratio [G:B] and ratio [G:B1] that are held in storage unit 4-2 as initial values. Control unit 1-2 calculates the adjustment value of light source 6-2 on the basis of the measurement value and target value of green light quantity G and adjusts the luminance of light source 6-2 on the basis of the adjustment value. Control unit 1-2 further calculates the adjustment value of light source 7-2 on the basis of the measurement value and target value of blue light quantity B2 and adjusts the luminance of light source 7-2 on the basis of the adjustment value.

In projector 103, control unit 1-3 sets the target value of green light quantity G to the value of reference green light quantity G' in accordance with a luminance adjustment command signal and sets the target values of blue light quantities B, B1 and B2 on the basis of ratio [G:B] and ratio [G:B1] that are held as initial values in storage unit 4-3. Control unit 1-3 calculates the adjustment value of light source 6-3 on the basis of the measurement value and target value of green light quantity G and adjusts the luminance of light source 6-3 on the basis of the adjustment value. Control unit 1-3 further calculates the adjustment value of light source 7-3 on the basis of the measurement value and target value of blue light quantity B2 and adjusts the luminance of light source 7-3 on the basis of the adjustment value.

As described hereinabove, projectors 100-103 adjust the luminance of light sources on the basis of reference green light quantity G' that is the smallest green light quantity, whereby the luminance of each of screens 200-203 can be set to the same level and the color balance of the entire multi-screen can be accurately adjusted.

Figure 6:
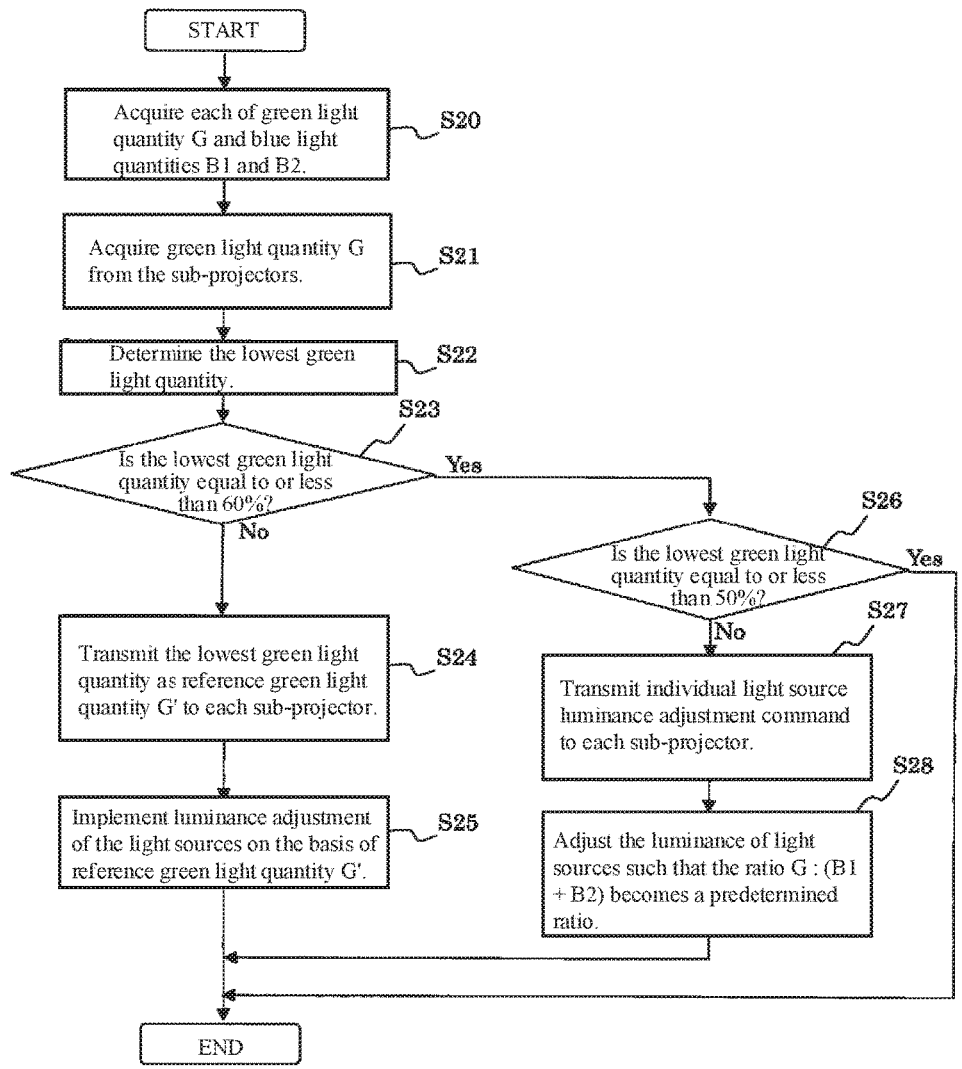
FIG. 6 is a flow chart showing the procedures of the multi-screen luminance adjustment process of the main projector of the display system shown in FIG. 4.

FIG. 6 shows the procedure of the multi-screen luminance adjustment process of projector 100 that is the main projector.

Referring to FIG. 6, control unit 1-0 uses light sensor 12-0 to acquire each of green light quantity G and blue light quantities B1 and B2 (Step S20). The operation of acquiring green light quantity G and blue light quantities B1 and B2 is as described in the first example embodiment.

Control unit 1-0 next acquires green light quantity information G-1-G-3 from projectors 101-103 (Step S21).

Control unit 1-0 then compares the four measurement values of the measurement value of green light quantity G that were acquired in Step S20 and the measurement values of green light quantity G that are contained in each of green light quantity G information G-1-G-3 that was acquired in Step S21. Control unit 1-0 then determines the lowest value of these four measurement values as the lowest green light quantity (Step S22).

Next, control unit 1-0 compares the lowest green light quantity with the initial value of green light quantity G that is held in storage unit 4-0 and determines whether the lowest green light quantity is equal to or less than 60% of the initial value of green light quantity G (Step S23).

If the determination result of Step S23 is "NO," control unit 1-0 takes the lowest green light quantity as reference green light quantity G' and transmits a luminance adjustment command signal containing reference green light quantity G' to each of projectors 101-103 (Step S24).

After transmission of the luminance adjustment command signal, control unit 1-0 adjusts the luminance of light sources 6-0 and 7-0 on the basis of the value of reference green light quantity G' (Step S25). In this luminance adjustment, control unit 1-0 sets the target value of green light quantity G to the value of reference green light quantity G' and sets the target values of blue light quantities B, B1, and B2 on the basis of ratio [G:B] and ratio [G:B1] that are held in storage unit 4-0. Control unit 1-0 calculates the adjustment value of light source 6-0 on the basis of the measurement value and target value of green light quantity G and adjusts the luminance of light source 6-0 on the basis of the adjustment value. Control unit 1-0 further calculates the adjustment value of light source 7-0 on the basis of the measurement value and target value of blue light quantity B2 and adjusts the luminance of light source 7-0 on the basis of the adjustment value. These adjustment operations are as described in the first example embodiment.

If the determination result of Step S23 is "YES," control unit 1-0 determines whether the lowest green light quantity is equal to or less than 50% of the initial value of green light quantity G (Step S26).

If the determination result of Step S26 is "NO," control unit 1-0 halts the luminance adjustment on the basis of reference green light quantity G' and transmits individual luminance adjustment command signals indicating the individual implementation of luminance adjustment of light sources to each of projectors 101-103 (Step S27). Individual luminance adjustment means that the luminance of light sources is to be adjusted in each of projectors 100-103 such that ratio G:(B1+B2) becomes the predetermined ratio. Control unit 1-0 adjusts the luminance of light sources 6-0 and 7-0 such that ratio G:(B1+B2) becomes a predetermined ratio on the basis of the measurement value of green light quantity G and the measurement values of blue light quantities B1 and B2 (Step S28) that were acquired in Step S20. This adjustment operation is as described in the first example embodiment.

If the determination result of Step S26 is "YES," control unit 1-0 terminates the multi-screen luminance adjustment process without carrying out luminance adjustment.

Figure 7:
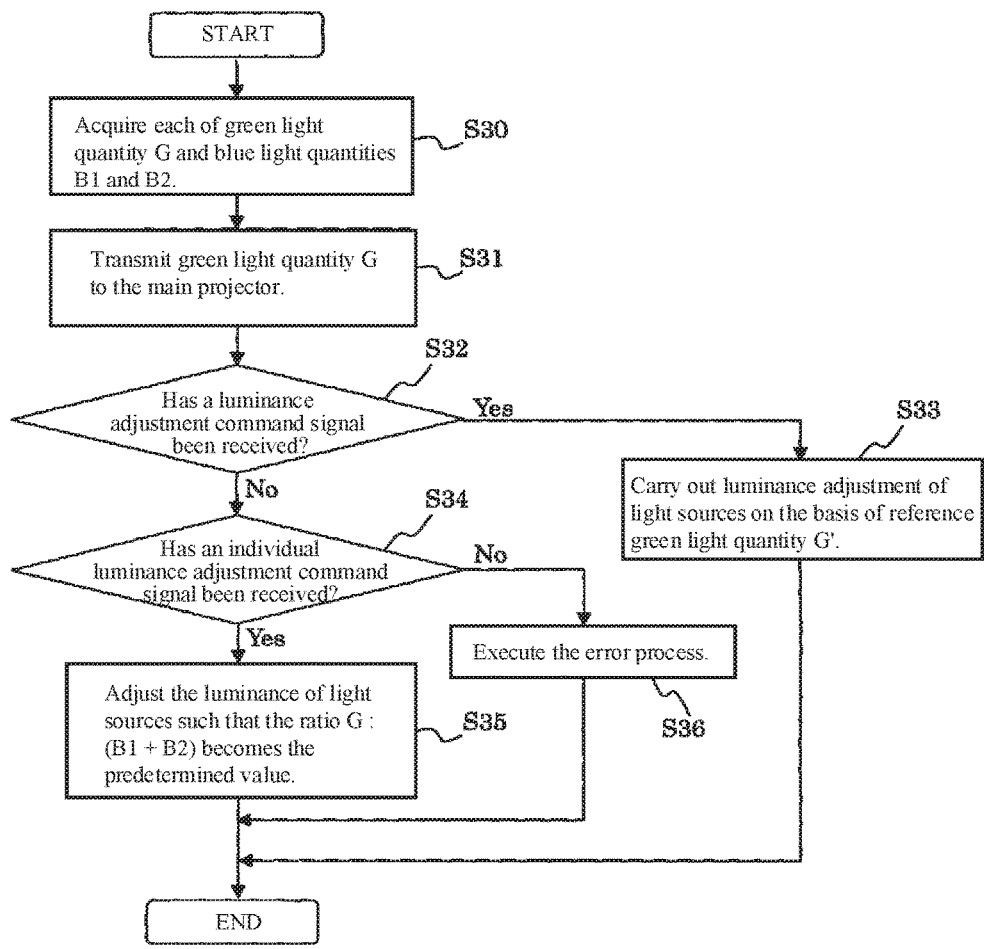
FIG. 7 is a flow chart showing the procedures of the multi-screen luminance adjustment process of the sub-projectors of the display system shown in FIG. 4.

FIG. 7 shows the procedure of the multi-screen luminance adjustment process of a sub-projector. All of projectors 101-103, which are sub-projectors, execute the multi-screen luminance adjustment process shown in FIG. 7, but for the sake of convenience, the operation of projector 101 is described.

Control unit 1-1 uses light sensor 12-1 to acquire each of green light quantity G and blue light quantities B1 and B2 (Step S30). The acquisition operation of green light quantity G and blue light quantities B1 and B2 is as described in the first example embodiment.

Control unit 1-1 next transmits green light quantity information G-1 that contains the measurement value of green light quantity G and identification information of projector 101 to projector 100 in accordance with a transmission request from projector 100 (Step S31).

After transmitting green light quantity information G-1, control unit 1-1 determines whether a luminance adjustment command signal has been received from projector 100 (Step S32).

If the determination result of Step S32 is "YES," control unit 1-1 adjusts the luminance of light sources 6-1 and 7-1 on the basis of the value of reference green light quantity G' (Step S33). In this luminance adjustment, control unit 1-1 sets the target value of green light quantity G to the value of reference green light quantity G' and sets the target values of blue light quantities B, B1, and B2 on the basis of ratio [G:B] and ratio [G:B1] that are held in storage unit 4-1. Control unit 1-1 calculates the adjustment value of light source 6-1 on the basis of the measurement value and the adjustment value of green light quantity G and adjusts the luminance of light source 6-1 on the basis of the adjustment value. Control unit 1-1 further calculates the adjustment value of light source 7-1 on the basis of the measurement value and target value of blue light quantity B2 and adjusts the luminance of light source 7-1 on the basis of the adjustment value. These adjustment operations are as described in the first example embodiment.

If the determination result of Step S32 is "NO," control unit 1-1 determines whether an individual luminance adjustment command signal has been received from projector 100 (Step S34).

If the determination result of Step S34 is "YES," control unit 1-1 adjusts the luminance of the light sources on the basis of the measurement values of blue light quantities B1 and B2 and the measurement value of green light quantity G that were acquired in Step S30 such that ratio G:(B1+B2) becomes the predetermined ratio. The adjustment operation is as described in the first example embodiment.

If the determination result of Step S34 is "NO," control unit 1-1 carries out an error process without implementing luminance adjustment (S36). In the error process, control unit 1-1 carries out a process for displaying on screen 201 an image that contains a message indicating that the multi-screen luminance adjustment process cannot be executed.

In FIG. 7, Step S32 and Step S34 are shown as separate determination steps, but indicate the determination of whether a luminance adjustment command signal or an individual luminance adjustment command signal has been received within a fixed time interval after the transmission of green light quantity information G-1.

Before the process of Step S35, determination may be made whether the measurement value of green light quantity G is equal to or less than a threshold value. In this case, if the measurement value of green light quantity G is equal to or less than the threshold value, control unit 1-1 ends the multi-screen luminance adjustment process without carrying out luminance adjustment. If the measurement value of green light quantity G is greater than the threshold value, control unit 1-1 executes the process of Step S35. The threshold value may be, for example, 60% or 50% of the initial value. This process can also be applied in the process of Step S28 of FIG. 6.

According to the display system described above, the luminance (green light quantity) of each projector is adjusted taking as a reference the luminance of the projector in which green light quantity G is the lowest (lowest green light quantity), whereby the difference in luminance among the screens that make up the multi-screen can be reduced, and moreover, the correction of color balance in the entire multi-screen can be accurately implemented.

Further, when the lowest green light quantity is equal to or lower than a first threshold value (for example, 60%) but greater than a second threshold value (for example, 50%), projectors 100-103 carry out luminance adjustment individually without carrying out luminance adjustment on the basis of the lowest green light quantity. In this way, decrease of the luminance of the overall multi-screen can be prevented, and the color balance of each of projectors 100-103 can be accurately corrected.

When the lowest green light quantity is equal to or lower than the second threshold value (for example, 50%), terminating the multi-screen luminance adjustment process prevents a further decrease of the luminance of the overall multi-screen, and moreover, can alert the user that the system will soon need maintenance or is at the end of its service life.

The lighting device, projector, and display system described hereinabove are merely examples of the present invention, and the configuration and operation can be altered as appropriate.

For example, in the second example embodiment, projectors 100-103 may be provided with a multi-mode setting function. A multi-mode setting function is a function in which, upon receiving a predetermined input operation for multi-mode setting after having saved the measurement values of each of green light quantity G and blue light quantities B, B1, and B2 as initial values in storage unit 4, control unit 1 limits green light quantity G to 80% of the initial value. When the measurement value of green light quantity G falls below 80% of the initial value, the luminance of light source 6 is increased. When the measurement value of green light quantity G falls below 80% of the initial value when the step value of light source 6 has reached 128, which is the maximum value, a luminance adjustment process is executed based on the lowest green light quantity. According to this multi-mode setting function, light source 6 is operated at a light quantity that is 80% of the maximum light quantity, and as a result, the luminance of the projection screen drops, but uniform luminance (80%) can be maintained over a long time period. The luminance of a laser element normally decreases to 80% luminance after roughly 10000 hours. As a result, the screen can be maintained at 80% luminance for a period of about 10000 hours.

In each of the example embodiments, light sensor 12 may be provided with a B filter, and in place of a G filter, may be provided with, for example, an R filter or a Y filter. Control unit 1 may also carry out luminance adjustment such that the ratio of the blue component and, in place of the green component, the red component or yellow component that is detected by light sensor 12 becomes the predetermined ratio. In other words, the luminance adjustment may be carried out such that the ratio of the blue component and a component of a predetermined wavelength that is contained in the yellow fluorescent light becomes the predetermined ratio.

Further, although the light quantity W (watts), i.e., electric power, was used in each of the example embodiments, lumens, i.e., brightness, may also be used in place of W (watts). Regarding light quantity, W (watts) and lumens can be placed in correspondence according to wavelength. In other words, settings can be made according to the units that are detected by the light sensor.

Still further, the luminance adjustment is executed at the time an instruction to start lighting the light source is detected and the light source lights up, at the time an instruction to stop lighting the light source is detected, and at the time an instruction indicating an adjustment process is detected.

Finally, the present invention can take the forms such as shown in the following SUPPLEMENTARY NOTES 1-21 but is not limited to these forms.

[Supplementary Note 1]

A lighting device includes:

a first light source that supplies yellow fluorescent light;

a second light source that supplies blue light;

a light sensor that detects the light quantity of the blue component of combined light in which the blue light and the yellow fluorescent light have been combined and the light quantity of a first color component that is contained in the yellow fluorescent light and that differs from the blue component; and a control unit that adjusts the luminance of the first and second light sources;

wherein the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and, on the basis of the first to third light quantities, adjusts the luminance of the first and second light sources such that the ratio of the light quantities of the first color component and the blue component of the combined light becomes a predetermined ratio.

[Supplementary Note 2]

In the lighting device as described in SUPPLEMENTARY NOTE 1, when the light quantity of yellow fluorescent light that is supplied from the first light source decreases, the control unit calculates the target value of the third light quantity on the basis of the first and second light quantities and the predetermined ratio and decreases the luminance of the second light source on the basis of a value obtained by dividing the target value by the third light quantity.

[Supplementary Note 3]

In the lighting device as described in SUPPLEMENTARY NOTE 1 or 2, when the light quantity of blue light that is supplied from the second light source decreases, the control unit calculates a target value of the third light quantity on the basis of the first and second light quantities and the predetermined ratio and increases the luminance of the second light source on the basis of a value obtained by dividing the target value by the third light quantity.

[Supplementary Note 4]

In the lighting device as described in SUPPLEMENTARY NOTE 3, when the target value of the third light quantity surpasses the maximum light quantity of the second light source, the control unit sets the target value of the first light quantity to a value lower than the first light quantity, calculates the target value of the second light quantity on the basis of the ratio of the target value of the first light quantity and the first and second light quantities, calculates the target value of the third light quantity on the basis of the target values of each of the first and second light quantities and the predetermined ratio, decreases the luminance of the first light source on the basis of a value obtained by dividing the target value of the first light quantity by the first light quantity, and adjusts the luminance of the second light source on the basis of a value obtained by dividing the target value of the third light quantity by the third light quantity.

[Supplementary Note 5]

In the lighting device as described in any one of SUPPLEMENTARY NOTES 1 to 4: the first light source includes a first blue laser element that supplies excitation light and a phosphor unit that includes a phosphor that is excited by the excitation light and emits yellow fluorescent light; the second light source includes a second blue laser element that supplies blue light; and the control unit adjusts the luminance of the first and second blue laser elements.

[Supplementary Note 6]

In the lighting device as described in any one of SUPPLEMENTARY NOTES 1 to 5, the first color component is a green component, a red component, or a yellow component.

[Supplementary Note 7]

The lighting device as described in any one of SUPPLEMENTARY NOTES 1 to 6 further includes:

a color combination element that: is provided at the position at which the luminous flux of the yellow fluorescent light and the luminous flux of the blue light intersect such that the yellow fluorescent light is incident to a first surface and the blue light is incident to a second surface that is on the side opposite the first surface; is configured to reflect, of visible light, light of the blue wavelength band, and moreover, to transmit light of wavelength bands other than the blue wavelength band or to transmit light of the blue wavelength band, and moreover, to reflect light of wavelength bands other than the blue wavelength band; and generates the combined light; and a light-dividing element that divides the combined light into first and second luminous flux;

wherein the light sensor detects the second luminous flux and supplies a signal that indicates each of the light quantity of the first color component and the light quantity of the blue component of the second luminous flux.

[Supplementary Note 8]

A projector includes:

a first light source that supplies yellow fluorescent light;

a second light source that supplies blue light;

a light sensor that detects the light quantity of a blue component of combined light in which the blue light and the yellow fluorescent light have been combined and the light quantity of a first color component that is contained in the yellow fluorescent light and that differs from the blue component;

display elements that modulate the combined light on the basis of a picture signal to form images;

projection optics that project images that were formed in the display elements; and a control unit that controls the luminance of the first and second light sources;

wherein the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and on the basis of the first to third light quantities, adjusts the luminance of the first and second light sources such that the ratio of the light quantities of the first color component and the blue component of the combined light becomes a predetermined ratio.

[Supplementary Note 9]

In the projector as described in SUPPLEMENTARY NOTE 8, when the light quantity of the yellow fluorescent light that is supplied from the first light source decreases, the control unit calculates the target value of the third light quantity on the basis of first and second light quantities and the predetermined ratio, and decreases the luminance of the second light source on the basis of a value obtained by dividing the target value by the third light quantity.

[Supplementary Note 10]

In the projector as described in SUPPLEMENTARY NOTE 8 or 9, when the light quantity of blue light that is supplied from the second light source decreases, the control unit calculates the target value of the third light quantity on the basis of the first and second light quantities and the predetermined ratio and increases the luminance of the second light source on the basis of a value obtained by dividing the target value by the third light quantity.

[Supplementary Note 11]

In the projector as described in SUPPLEMENTARY NOTE 10, when the target value of the third light quantity surpasses the maximum light quantity of the second light source, the control unit sets the target value of the first light quantity to a value that is lower than the first light quantity, calculates the target value of the second light quantity on the basis of the target value of the first light quantity and the ratio of first and second light quantities, calculates the target value of the third light quantity on the basis of the target value of each of the first and second light quantities and the predetermined ratio, decreases the luminance of the first light source on the basis of a value obtained by dividing the target value of the first light quantity by the first light quantity, and adjusts the luminance of the second light source on the basis of a value obtained by dividing the target value of the third light quantity by the third light quantity.

[Supplementary Note 12]

In the prjoector as described in any one of SUPPLEMENTARY NOTES 8 to 11:

the first light source includes:

a first blue laser element that supplies excitation light; and a phosphor unit that includes a phosphor that is excited by the excitation light and that emits yellow fluorescent light;

the second light source includes a second blue laser element that supplies blue light; and the control unit adjusts the luminance of the first and second blue laser elements.

[Supplementary Note 13]

In the projector as described in any one of SUPPLEMENTARY NOTES 8 to 12, the first color component is a green component, a red component, or a yellow component.

[Supplementary Note 14]

The projector as described in any one of SUPPLEMENTARY NOTES 8 to 13 further includes:

a color combination element that: is provided at the position at which the luminous flux of the yellow fluorescent light and the luminous flux of the blue light intersect such that the yellow fluorescent light is incident to a first surface and the blue light is incident to a second surface that is on the side opposite the first surface; is configured to reflect, of visible light, light of the blue wavelength band, and moreover, transmit light of wavelength bands other than the blue wavelength band or to transmit light of the blue wavelength band, and moreover, reflect light of wavelength bands other than the blue wavelength band; and generates the combined light; and a light-dividing element that divides the combined light into first and second luminous flux;

wherein the light sensor detects the second luminous flux and supplies a signal that indicates each of the light quantity of the first color component and the light quantity of the blue component of the second luminous flux.

[Supplementary Note 15]

A display system includes a plurality of projectors that are connected together to enable intercommunication, each of the plurality of projectors including:

a first light source that supplies yellow fluorescent light;

a second light source that supplies blue light;

a light sensor that detects the light quantity of a blue component of combined light in which the blue light and the yellow fluorescent light have been combined and the light quantity of a first color component that is contained in the yellow fluorescent light and that differs from the blue component;

display elements that modulate the combined light on the basis of a picture signal to form images;

projection optics that project image formed in the display elements; and a control unit that controls the luminance of the first and second light sources;

wherein:

the control unit acquires each of a first light quantity that is the light quantity of the first color component and a second light quantity that is the light quantity of the blue component in a first state in which the first light source is ON and the second light source is OFF; acquires a third light quantity that is the light quantity of the blue component in a second state in which the first light source is OFF and the second light source is ON; and, on the basis of the first to third light quantities, adjusts the luminance of the first and second light sources such that the ratio of the light quantities of the first color component and the blue component of the combined light becomes a predetermined ratio;

one of the plurality of projectors is a main projector, and the other projectors are sub-projectors; and the control unit of the main projector controls the luminance adjustment of the first and second light sources in its own projector and in each of the sub-projectors taking as a standard the smallest measurement value among the first light quantity of its own projector and the first light quantities of the sub-projectors.

[Supplementary Note 16]

A light source adjustment method of a lighting device that is provided with: a first light source that supplies yellow fluorescent light, a second light source that supplies blue light, and a light sensor that detects the light quantity of a blue component of combined light in which the blue light and the yellow fluorescent light have been combined and the light quantity of a first color component that is contained in the yellow fluorescent light and that differs from the blue component; the method includes:

acquiring each of a first light quantity that is the light quantity of the first color component and a second light quantity that is the light quantity of the blue component in a first state in which the first light source is ON and the second light source is OFF;

acquiring a third light quantity that is the light quantity of the blue component in a second state in which the first light source is OFF and the second light source is ON; and on the basis of the first to third light quantities, adjusting the luminance of the first and second light sources such that the ratio of the light quantities of the first color component and the blue component of the combined light becomes a predetermined ratio.

[Supplementary Note 17]

In the light source adjustment method as described in SUPPLEMENTARY NOTE 16, when the light quantity of the yellow fluorescent light that is supplied from the first light source decreases, the control unit calculates the target value of the third light quantity on the basis of the first and second light quantities and the predetermined ratio, and decreases the luminance of the second light source on the basis of a value obtained by dividing the target value by the third light quantity.

[Supplementary Note 18]

In the light source adjustment method as described in SUPPLEMENTARY NOTE 16 or 17, when the light quantity of blue light that is supplied from the second light source decreases, the control unit calculates the target value of the third light quantity on the basis of the first and second light quantities and the predetermined ratio and increases the luminance of the second light source on the basis of a value obtained by dividing the target value by the third light quantity.

[Supplementary Note 19]

In the light source adjustment method as described in SUPPLEMENTARY NOTE 18, when the target value of the third light quantity surpasses the maximum light quantity of the second light source, the control unit: sets the target value of the first light quantity to a value lower than the first light quantity, calculates the target value of the second light quantity on the basis of the target value of the first light quantity and the ratio of the first and second light quantities, calculates the target value of the third light quantity on the basis of the target value of each of the first and second light quantities and the predetermined ratio, decreases the luminance of the first light source on the basis of a value obtained by dividing the target value of the first light quantity by the first light quantity, and adjusts the luminance of the second light source on the basis of a value obtained by dividing the target value of the third light quantity by the third light quantity.

[Supplementary Note 20]

In the light source adjustment method as described in any one of SUPPLEMENTARY NOTES 16 to 19, the first light source includes a first blue laser element that supplies excitation light and a phosphor unit that includes a phosphor that is excited by the excitation light and that emits yellow fluorescent light, and the second light source includes a second blue laser element that supplies blue light; and the luminance adjustment of the first and second light sources adjusts the luminance of the first and second blue laser elements.

[Supplementary Note 21]

In the light source adjustment method as described in any one of SUPPLEMENTARY NOTES 16 to 20, the first color component is a green component, a red component, or a yellow component.

EXPLANATION OF REFERENCE NUMBERS 1 control unit
2,3 light source drive unit
4 storage unit
5 console
6,7 light source
6a, 7a blue laser element
8 phosphor wheel
9, 10 dichroic mirror
11 reflecting mirror
12 light sensor
13 color separation and combination optics
14 projection optics
15 lighting device

The invention claimed is:

1. A lighting device, comprising:
a first light source that supplies yellow fluorescent light;
a second light source that supplies blue light;
a light sensor that detects a light quantity of a blue component of combined light, in which said blue light and said yellow fluorescent light have been combined, and a light quantity of a first color component that is contained in said yellow fluorescent light and that differs from said blue component; and
a control unit that adjusts a luminance of said first and second light sources;
wherein said control unit acquires each of a first light quantity that is the light quantity of said first color component and a second light quantity that is the light quantity of said blue component in a first state in which said first light source is ON and said second light source is OFF, acquires a third light quantity that is the light quantity of said blue component in a second state in which said first light source is OFF and said second light source is ON, and, on a basis of said first to third light quantities, adjusts the luminance of said first and second light sources such that a ratio of the light quantities of said first color component and said blue component of said combined light becomes a predetermined ratio.

2. The lighting device as set forth in claim 1, wherein, when a light quantity of yellow fluorescent light that is supplied from said first light source decreases, said control unit calculates a target value of said third light quantity on a basis of said first and second light quantities and said predetermined ratio and decreases the luminance of said second light source on a basis of a value obtained by dividing the target value by said third light quantity.

3. The lighting device as set forth in claim 1, wherein, when the light quantity of blue light that is supplied from said second light source decreases, said control unit calculates a target value of said third light quantity on a basis of said first and second light quantities and said predetermined ratio and increases the luminance of said second light source on a basis of a value obtained by dividing the target value by said third light quantity.

4. The lighting device as set forth in claim 3, wherein, when the target value of said third light quantity surpasses a maximum light quantity of said second light source, said control unit sets the target value of said first light quantity to a value lower than said first light quantity, calculates a target value of said second light quantity on a basis of the target value of said first light quantity and g ratio of said first and second light quantities, calculates a target value of said third light quantity on a basis of the target values of each of said first and second light quantities and said predetermined ratio, decreases the luminance of said first light source on a basis of a value obtained by dividing the target value of said first light quantity by said first light quantity, and adjusts the luminance of said second light source on a basis of a value obtained by dividing the target value of said third light quantity by said third light quantity.

5. The lighting device as set forth in claim 1, wherein said first light source includes:
  a first blue laser element that supplies an excitation light; and
  a phosphor unit that includes a phosphor that is excited by said excitation light and that emits yellow fluorescent light,
  wherein said second light source includes a second blue laser element that supplies blue light, and
  wherein the control unit adjusts the luminance of said first and second blue laser elements.

6. The lighting device as set forth in claim 1, wherein said first color component includes a green component, a red component, or a yellow component.

7. The lighting device as set forth in claim 1, further comprising:
  a color combination element that:
    is provided at a position at which luminous flux of said yellow fluorescent light and luminous flux of said blue light intersect such that said yellow fluorescent light is incident to a first surface and said blue light is incident to a second surface that is on the side opposite said first surface;
    is configured to reflect, of visible light, light of the blue wavelength band, to transmit light of wavelength bands other than the blue wavelength band or to transmit light of the blue wavelength band, and to reflect light of wavelength bands other than the blue wavelength band; and
    generates the combined light; and
  a light-dividing element that divides said combined light into first and second luminous flux,
  wherein said light sensor detects said second luminous flux and supplies a signal that indicates each of the light quantity of said first color component and the light quantity of said blue component of the second luminous flux.

8. A projector, comprising:
  a first light source that supplies yellow fluorescent light;
  a second light source that supplies blue light;
  a light sensor that detects a light quantity of a blue component of combined light, in which said blue light and said yellow fluorescent light have been combined, and a light quantity of a first color component that is contained in said yellow fluorescent light and that differs from said blue component;
  a display element that modulates said combined light on a basis of a picture signal to form an image;
  projection optics that project an image that was formed in said display element; and
  a control unit that controls a luminance of said first and second light sources;
  wherein said control unit acquires each of a first light quantity that is the light quantity of said first color component and a second light quantity that is the light quantity of said blue component in a first state in which said first light source is ON and said second light source is OFF, acquires a third light quantity that is the light quantity of said blue component in a second state in which said first light source is OFF and said second light source is ON, and, on a basis of said first to third light quantities, adjusts the luminance of said first and second light sources such that a ratio of the light quantities of said first color component and said blue component of the combined light becomes a predetermined ratio.

9. The projector as set forth in claim 8, wherein, when a light quantity of yellow fluorescent light that is supplied from said first light source decreases, said control unit calculates a target value of said third light quantity on a basis of said first and second light quantities and said predetermined ratio and decreases the luminance of said second light source on a basis of a value obtained by dividing the target value by said third light quantity.

10. The projector as set forth in claim 8, wherein, when the light quantity of blue light that is supplied from said second light source decreases, said control unit calculates a target value of said third light quantity on a basis of said first and second light quantities and said predetermined ratio and increases the luminance of said second light source on a basis of a value obtained by dividing the target value by said third light quantity.

11. The projector as set forth in claim 10, wherein, when the target value of said third light quantity surpasses a maximum light quantity of said second light source, said control unit sets the target value of said first light quantity to a value lower than said first light quantity, calculates a target value of said second light quantity on a basis of the target value of said first light quantity and a ratio of said first and second light quantities, calculates a target value of said third light quantity on a basis of the target value of each of said first and second light quantities and said predetermined ratio, decreases the luminance of said first light source on a basis of a value obtained by dividing the target value of said first light quantity by said first light quantity, and adjusts the luminance of said second light source on a basis of a value obtained by dividing the target value of said third light quantity by said third light quantity.

12. The projector as set forth in claim 8, wherein said first light source includes:
  a first blue laser element that supplies excitation light; and
  a phosphor unit that includes a phosphor that is excited by said excitation light and that emits yellow fluorescent light,
  wherein said second light source includes a second blue laser element that supplies blue light,
  wherein said control unit adjusts the luminance of said first and second blue laser elements.

13. The projector as set forth in claim 8, wherein said first color component includes a green component, a red component, or a yellow component.

14. The projector as set forth in claim 8, further comprising:
  a color combination element that:
    is provided at a position at which luminous flux of said yellow fluorescent light and luminous flux of said blue light intersect such that said yellow fluorescent light is incident to a first surface and said blue light is incident to a second surface that is on the side opposite said first surface;

is configured to reflect, of visible light, light of the blue wavelength band, to transmit light of wavelength bands other than the blue wavelength band or to transmit light of the blue wavelength band, and to reflect light of wavelength bands other than the blue wavelength band; and generates the combined light; and a light-dividing element that divides said combined light into first and second luminous flux, wherein said light sensor detects said second luminous flux and supplies a signal that indicates each of the light quantity of said first color component and the light quantity of said blue component of the second luminous flux.

15. A display system that includes a plurality of projectors that are connected together to enable intercommunication, each of said plurality of projectors comprising:

a first light source that supplies yellow fluorescent light;

a second light source that supplies blue light;

a light sensor that detects a light quantity of a blue component of combined light, in which said blue light and said yellow fluorescent light have been combined, and a light quantity of a first color component that is contained in said yellow fluorescent light and that differs from said blue component;

a display element that modulates said combined light on a basis of a picture signal to form an image;

projection optics that project an image formed in said display element; and a control unit that controls a luminance of said first and second light sources, wherein said control unit acquires each of a first light quantity that is the light quantity of said first color component and a second light quantity that is the light quantity of said blue component in a first state in which said first light source is ON and said second light source is OFF, acquires a third light quantity that is the light quantity of said blue component in a second state in which said first light source is OFF and said second light source is ON, and, on a basis of said first to third light quantities, adjusts the luminance of said first and second light sources such that a ratio of the light quantities of said first color component and said blue component of said combined light becomes a predetermined ratio, wherein one of said plurality of projectors includes a main projector, and the other projectors are sub-projectors, and wherein said control unit of said main projector controls the luminance adjustment of said first and second light sources in its own projector and in each of said sub-projectors taking as a standard a smallest measurement value among said first light quantity of its own projector and said first light quantities of said sub-projectors.

16. A light source adjustment method of a lighting device that is provided with a first light source that supplies yellow fluorescent light, a second light source that supplies blue light, and a light sensor that detects a light quantity of a blue component of combined light, in which said blue light and said yellow fluorescent light have been combined, and a light quantity of a first color component that is contained in said yellow fluorescent light and that differs from said blue component, said method comprising:

acquiring each of a first light quantity that is the light quantity of said first color component and a second light quantity that is the light quantity of said blue component in a first state in which said first light source is ON and said second light source is OFF;

acquiring a third light quantity that is the light quantity of said blue component in a second state in which said first light source is OFF and said second light source is ON; and on a basis of said first to third light quantities, adjusting a luminance of said first and second light sources such that a ratio of the light quantities of said first color component and said blue component of said combined light becomes a predetermined ratio.

17. The light source adjustment method as set forth in claim 16, further comprising:

when a light quantity of yellow fluorescent light that is supplied from said first light source decreases, calculating a target value of said third light quantity on a basis of said first and second light quantities and said predetermined ratio, and decreasing the luminance of said second light source on a basis of a value obtained by dividing the target value by said third light quantity.

18. The light source adjustment method as set forth in claim 16, further comprising:

when the light quantity of blue light that is supplied from said second light source decreases, calculating a target value of said third light quantity on a basis of said first and second light quantities and said predetermined ratio, and increasing the luminance of said second light source on a basis of a value obtained by dividing the target value by said third light quantity.

19. The light source adjustment method as set forth in claim 18, further comprising:

when the target value of said third light quantity surpasses a maximum light quantity of said second light source, setting the target value of said first light quantity to a value lower than said first light quantity, calculating a target value of said second light quantity on a basis of the target value of said first light quantity and a ratio of said first and second light quantities, calculating a target value of said third light quantity on a basis of the target values of each of said first and second light quantities and said predetermined ratio, decreasing the luminance of said first light source on a basis of a value obtained by dividing the target value of said first light quantity by said first light quantity, and adjusting the luminance of said second light source on a basis of a value obtained by dividing the target value of said third light quantity by said third light quantity.

20. The light source adjustment method as set forth in claim 16, wherein said first light source includes:

a first blue laser element that supplies excitation light; and a phosphor unit that includes a phosphor that is excited by said excitation light and that emits yellow fluorescent light, and wherein said adjusting the luminance of said first and second light sources includes adjusting the luminance of said first and second blue laser elements.

* * * * *